July 26, 1932.   F. McLAUGHLIN   1,869,111
FISHING LURE
Filed Aug. 23, 1930    4 Sheets-Sheet 1

Inventor
F. McLaughlin
by J. Edw. Maybee
ATTY.

July 26, 1932.  F. McLAUGHLIN  1,869,111
FISHING LURE
Filed Aug. 23, 1930  4 Sheets-Sheet 2

Inventor
F. McLaughlin
by J. Edw. Maybee
ATTY.

July 26, 1932. F. McLAUGHLIN 1,869,111
FISHING LURE
Filed Aug. 23, 1930 4 Sheets-Sheet 3

Inventor
F. McLaughlin
by J. Edw Maybee
Att'y

July 26, 1932.  F. McLAUGHLIN  1,869,111
FISHING LURE
Filed Aug. 23, 1930   4 Sheets-Sheet 4
Fig. 25.
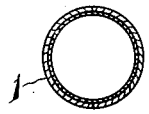
Fig. 26.
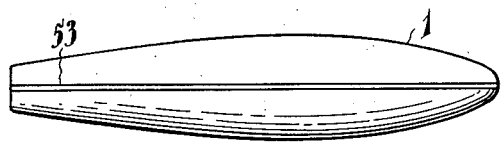
Fig. 27.
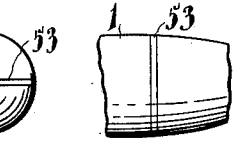
Fig. 28.  Fig. 28ª
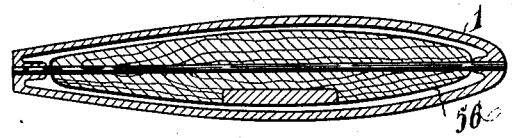
Fig. 29.
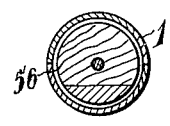
Fig. 30.
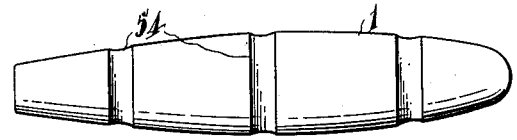
Fig. 31.
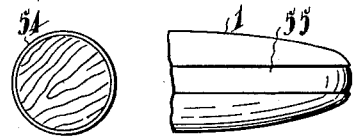
Fig. 32  Fig. 33ª
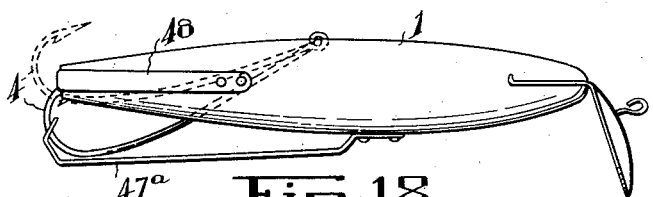
Fig. 18.
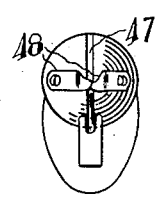
Fig. 17.
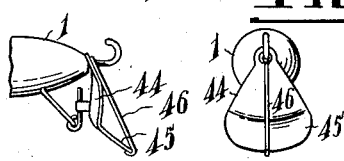
Fig. 34. Fig. 35.
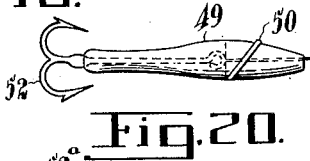
Fig. 20.
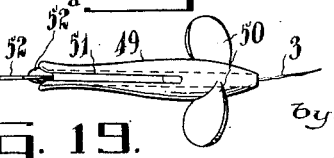
Fig. 19.
Inventor
F. McLaughlin
by J. Edw Maybee
ATTY Patented July 26, 1932

1,869,111

UNITED STATES PATENT OFFICE

FRANK McLAUGHLIN, OF TORONTO, ONTARIO, CANADA, ASSIGNOR TO WILLIAM CRAW-FORD GOFFATT, OF TORONTO, ONTARIO, CANADA

FISHING LURE

Application filed August 23, 1930, Serial No. 477,226, and in Canada April 17, 1930.

This invention relates to fishing lures of the type disclosed in my prior United States Patent No. 1,723,193 of August 6th, 1929, in which the barbed point of the hook is normally held in a shielded position, the fish in grabbing the lure releasing the hook so that the hook moves to a "catching" position.

In the constructon shown in the said patent, the hook was released by a displacement of the hook and body relative to one another. One object in the present case is to devise a construction in which the hook may be released prior to any relative movement between the hook and body.

Another object is to devise a construction in which the hook may become free of the body so that in the struggles of the fish to release itself, the plug will not be damaged, and in the event of the lure breaking, the plug may float to the surface of the water and be recovered.

Other objects of my invention will hereinafter appear in the following general description of my invention.

Figure 1:
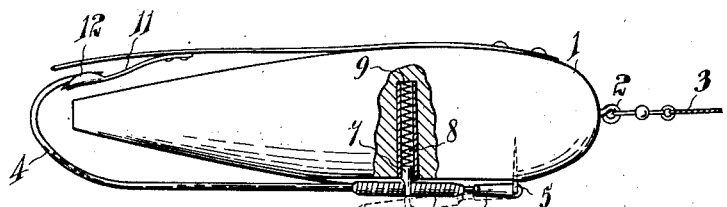
Figure 7:
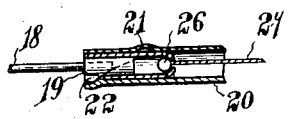
Figure 2:
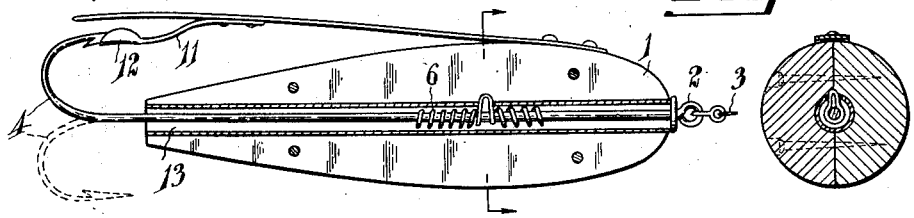
Figure 3:
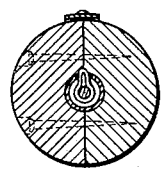
Figure 4:
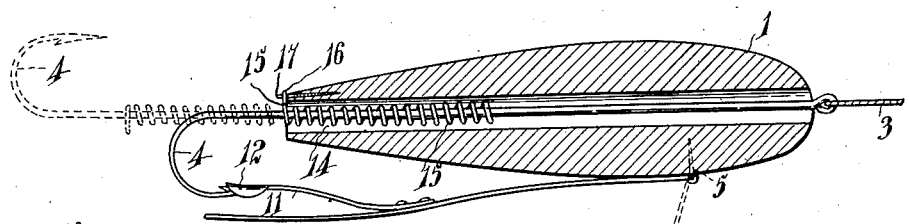
Figure 5:
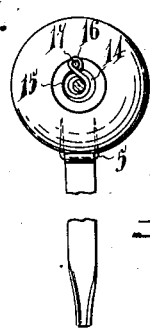
Figures 6, 8:
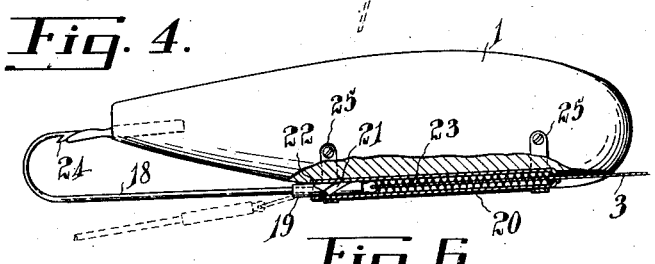
Figure 9:
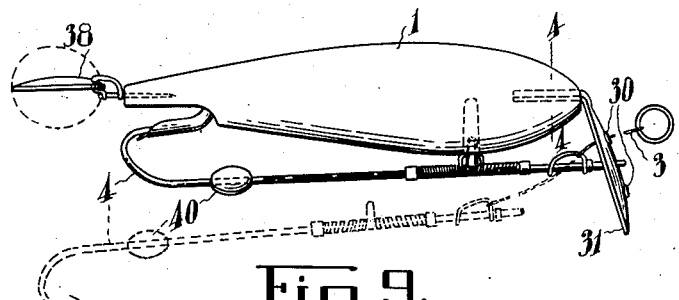
Figure 10:
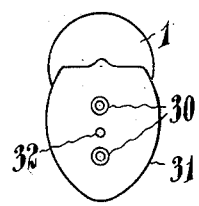
Figure 11:
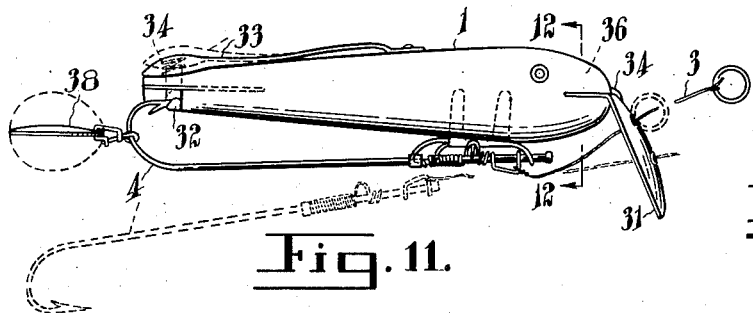
Figure 12:
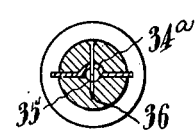
Figure 13:
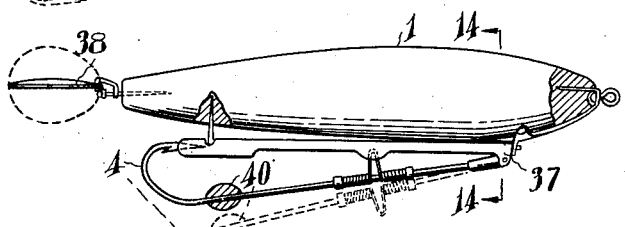
Figure 14:
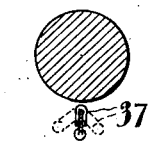
Figure 15:
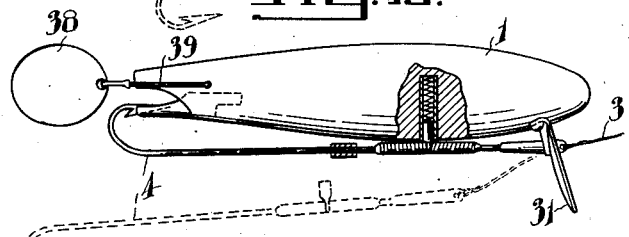
Figure 16:
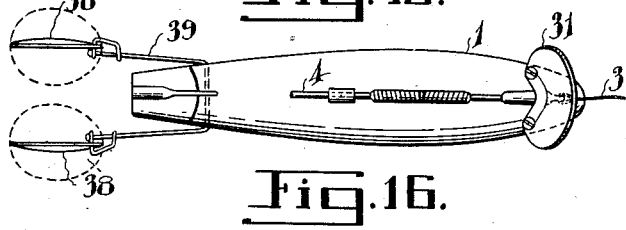
Figures 21, 22:
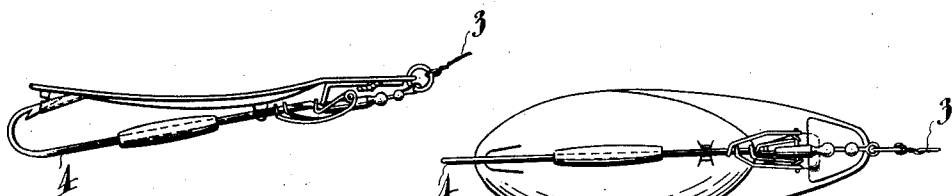
Figure 23:
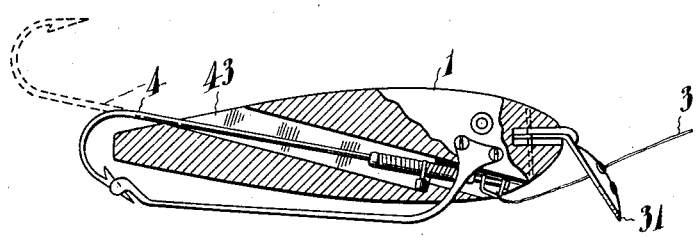
Figure 24:
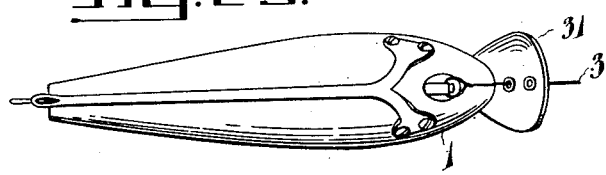

I attain my objects by means of the constructions hereinafter described and illustrated in the accompanying drawings in which Fig. 1 is a side elevation, partly broken away, of one form of my invention;

Fig. 2 a longitudinal vertical section of another form;

Fig. 3 a cross section of the form shown in Fig. 2;

Fig. 4 a longitudinal vertical section of still another form;

Fig. 5 a rear view of the lure shown in Fig. 4;

Fig. 6 a side elevation, partly broken away, of another lure construction;

Fig. 7 a detail illustrating a modification of the construction shown in Fig. 6;

Fig. 8 a detail illustrating another modification of the construction shown in Fig. 6;

Fig. 9 a side elevation of another form of lure;

Fig. 10 a front view of the same;

Fig. 11 a side view of another form;

Fig. 12 a section on the line 12—12 in Fig. 11;

Fig. 13 a side view, partly broken away, of another form;

Fig. 14 a cross section on the line 14—14 in Fig. 13;

Fig. 15 a side view of another form;

Fig. 16 a plan view of the underside of the bait shown in Fig. 15;

Fig. 17 a rear view of a modified form of bait;

Fig. 18 a side view of the same;

Fig. 19 a plan view of another form of lure;

Fig. 20 a side view of the same;

Fig. 21 a side elevation showing my invention applied to a bait of the spoon type;

Fig. 22 a plan view of the underside of the same;

Fig. 23 a modification of the bait shown in Fig. 2;

Fig. 24 a plan view of the underside of the same;

Figs. 25 to 33ª inclusive illustrate methods of applying markings to the bait bodies;

Fig. 34 a side view of part of a lure illustrating a modified form of wobbler; and Fig. 35 a front view of the same.

In the drawings like numerals of reference indicate corresponding parts in the different figures.

Referring to Fig. 1, 1 is the body of the bait having a screw eye 2 at its forward end, to which the line 3 is connected. 4 is the hook, the head 10 of the shank of which is swingably mounted on a staple 5 inserted in the body. On the shank is mounted a double coil spring 6 between the sections of which is connected a stem 7 adapted to fit in a hole 8 in the body. A spring 9 in the hole tends to project the stem 7 from the hole. The shank of the hook has a rotatable connection with the head whereby the hook may occupy either the position shown in full lines or dotted lines. To hold the hook in shielded position I provide the member 11, having lips 12 at opposite sides thereof to hold the hook from rotating. The member 11 is preferably formed of spring material, although the spring of the hook itself or of the spring 9 will allow sufficient movement of the hook to permit disengagement from the member 11.

The member 11 is preferably forked as shown, the engagement of the hook being with the under portion, the upper portion acting as a shield.

The fish, when grabbing the bait, moves the member 11 towards the body, thus releasing the barbed end from between the lips 12 and permitting the spring 6 to rotate the hook to the position shown in dotted lines.

In Figs. 2 and 3, the shank of the hook instead of being mounted exteriorly of the body is inserted in a central hole 13. In this case the body will preferably be formed in halves to permit the assembly of the parts. The line may either be connected to the body or to the shank of the hook. I show it as attached to the latter. The retaining means for the hook is substantially the same as shown in Fig. 1.

In Fig. 4 the body is provided with a central box 14 to receive the shank of the hook. The shank has a spring 15 for winding purposes, one end being secured to the shank and the other end provided with an eye 16 for engagement with a pin 17 on the end of the body. In this case also the line is connected with the shank of the hook. The hook, it will be noted, may be withdrawn from the body as indicated in dotted lines.

In this arrangement the retaining member instead of being of spring material is hingedly connected with the body, its weight tending to hold it in engagement with the barbed end of the hook.

It will be noted in each of these constructions that the hook does not move relative to the body until after its release through disengagement with the retaining member 11.

I may employ any suitable device at the forward end of the body to cause a diving or wobbling of the lure while travelling through the water.

In Fig. 6 a modification of the earlier form of lure is shown in which the body and hook move relative to one another to release the hook. The hook shank 18 is provided with an enlarged head 19 adapted to be received in a tube 20. The line 3 is connected to an eye on the end of the head 19. The head 19 is provided with a spiral groove 21 in which engages a projection 22 on the inside of the tube. A spring 23 is placed within the tube adapted to be put under compression by the insertion and turning of the head 19 in the tube 21, the spring thus tending to expel the hook head from the tube. The hook is held in place, however, by the engagement of the barbed end 24 of the hook with the special tail piece on the body 1. The tube 21 is held in place by straps 25.

In Fig. 7 the head 19 of the hook shank 18 is of tubular formation, the shank being suitably secured in one end and the other end being upset to hold in place a knob 26 on the end of a gimp 27 to which the line is attached.

In this case the projection 22 is formed on the head 19 and the spiral groove in the tube 20.

In Fig. 8 the spring 29 instead of remaining in the tube has one end secured to the head 19, and its other end 29 forms the projection which travels in the groove in the inside of the tube.

As stated in the preamble of this specification, a further object of the invention is to devise a construction in which the hook and body will separate, so that during the struggles of the fish to break loose, the plug will not be damaged, and in the event of the line breaking, the plug may be recovered and used with a fresh hook.

In Figs. 9 and 10 I show the line 3 attached directly to the hook 4. When the hook is released by the fish, the hook is free to move away as indicated in dotted lines and in the event of the line breaking, the plug 1 may float to the surface of the water. I show the line as passing through one of a series of holes 30 in the diving device 31 secured to the front of the plug 1. When the line is passed through the upper hole 30, when the bait is drawn through the water it will tend to travel at a deeper level than when the line is passed through the lower hole 30.

In this form the forward end of the shank of the hook is supported in an intermediate hole in the diving device 31.

In the bait shown in Fig. 11, the line is secured in the same manner as shown in Fig. 9, but a different spring arrangement is shown. The bait shown in this Fig. 11 is particularly adapted for "casting". The barbed end of the hook 4 is caught in a hooked member 32 vertically movable in a hole in the rear end of the body and carried by a spring lever 33. A spring 34 in the hole tends to move the hooked member upwardly to retain its engagement with the barb of the hook 4. To release the hook it is necessary to exert pressure on both the hook 4 and lever 33 and consequently when the lure is cast into the water, and moves either the lever for example relative to the body, the hook will move in the opposite direction and will not therefore be released. So too, if the hook 4 strikes the water first, the lever 33 will be moved outwardly by the spring 34 to return the engagement with the hook.

In Fig. 12 is illustrated the method of mounting the diving device. A hole 35 is bored in the head of the plug and a transverse slot is formed, having this hole for its centre. The diving device is formed with a rib 34ᵃ on its upper surface which fits the upper half of the hole 35. With this arrangement the diving device is always accurately centered and is held in place by a single pin 36.

In Figs. 15 and 16 a construction similar to that shown in Fig. 9 is shown with a different type of diving device.

In Figs. 13 and 14 the hook 4 is mounted upon a swinging frame 37 pivoted on the under side of the plug or body.

In Figs. 21 and 22 I show my improved hook as applied to a lure of the spoon type.

In Figs. 23 and 24 I show a lure similar to that shown in Fig. 2. The hole 43 for the shank of hook is arranged at an angle to the horizontal and the hook is free to be disengaged from the plug on release in the same manner as with the baits shown in Figs. 9, 11 and 15, while the diving device is similar to that shown in Figs. 9 to 12 inclusive.

In Figs. 34 and 35 an improved form of diving device is shown. The device is of the spoon type and is bent intermediate its ends to provide a downwardly directed portion 44 and a forwardly and downwardly directed portion 45. A guard part 46 extends on a line connecting the ends of the spoon.

In Figs. 17 and 18 I show a weedless hook arrangement in which the hook is not rotatable as in the other forms. The hook 4 is pivoted to swing in the vertical plane in a slot 47 formed in the plug. A spring lever 47ᵃ is secured to the plug and tends to rock the hook to the exposed position as shown in dotted lines. To the sides of the plug are secured spring retainers 48, which extend around the rear of the plug, as illustrated in Fig. 18 and retains the barbed end of the hook in shielded position against the action of the lever 47. The retainers are easily pushed out of the way when pressure is applied to the lever 47ᵃ as when the lure is grabbed by a fish.

In Figs. 19 and 20 is shown a bait of a different type. The body 49 is of metal and provided with wings 50 arranged to give the bait a rotary movement when drawn through the water. The rear end of the body is formed with a long slot 51 in which the shank of the hook 52 is fitted. The eye of the hook lies flat in the slot and the shank is provided with an enlargement 52ᵃ which tends to prevent rocking of the hook while the latter is in the slot. The line 3 extends through an axially arranged hole in the front end of the bait and is connected with the eye of the hook.

It is found that the fish is attracted by the flashing of a moving part, and I therefore provide at the rear end of the lure one or more small spoons or spinners 38. These spoons may be mounted on the rear of the plug itself as shown in Fig. 9, or on the hook as shown in Fig. 11, or on a separate attachment such as 39 as shown in Fig. 16. In the later case two of these spoons 38 are shown. Various other connections than that shown in Fig. 16 may, of course, be devised.

The shank of the hook may also be provided with a weight 40 such as shown in Figs. 9 and 13 for the purpose of giving the lure the proper balance to hold the hook lowermost.

In Figs. 25 to 33 inclusive I illustrate various methods of applying coloring or designs to the body.

In Figs. 25 and 26 the body is formed of two hollow sections of transparent material to the interior surfaces of which the coloring is applied. The sections are subsequently secured together so that the coloring is protected from damage by the water.

In Figs. 27 and 28 I show the body divided longitudinally with an insert 53 of a distinguishing color, the parts being secured together in any suitable manner. The body may be divided transversely as shown in Fig. 28ᵃ if desired.

In Figs. 31 and 32, the body is shown provided with annular grooves 54 in which a band of paint or other material of contrasting color is placed. Grooves 55 may be formed lengthwise of the body also if desired, as indicated in Fig. 33ᵃ.

In Figs. 29 and 30 the body is formed of transparent material and within the body is a movably mounted or colored member 56 which is preferably weighted so that it will swing from side to side within the body. Various modifications of this idea are possible.

What I claim as my invention is:

1. In a fishing bait, the combination of a body; a hook having its shank rotatably mounted relative to the body; means tending to rotate the hook; and means movable to and from the body but resistant to lateral movement relative to the body adapted to be releasably engaged with the hook to hold the latter from rotation.

2. In a fishing bait, the combination of a body; a hook having its shank rotatably mounted relative to the body; means tending to rotate the hook; and a spring retaining member mounted on the body movable to and from the same but resistant to relative lateral movement and adapted to be releasably engaged with the hook to hold the latter from rotation.

3. In a fishing bait, the combination of a body, a hook having its shank rotatably mounted relative to the body; means tending to rotate the hook; and a retaining member having one end connected with the body and its other end movable to and from the body but resistant to lateral movement relative to the body and adapted to be releasably engaged with the hook to hold the latter from rotation.

4. In a fishing bait, the combination of a body, a hook having its shank rotatably mounted relative to the body; means tending to rotate the hook; and a retaining member having one end connected with the body and its other end movable to and from the body but resistant to lateral movement relative to the body and adapted to be releasably engaged with the hook to hold the latter from rotation, said other end being forked, one portion of the said forked end being shaped to prevent rotation of the hook when the latter is engaged therewith the other part of the forked end overlying the first mentioned part to shield the point of the hook.

Signed at the City of Toronto, Canada, this 30th day of July, 1930.

FRANK McLAUGHLIN.